United States Patent

[11] 3,626,274

[72] Inventor Wolfgang F. Christofzik
 Lake Hiawatha, N.J.
[21] Appl. No. 72,932
[22] Filed Sept. 17, 1970
[45] Patented Dec. 7, 1971
[73] Assignee Pennwalt Corporation
 Philadelphia, Pa.

[54] TWO-WIRE MILLIVOLT TO MILLIAMPERE SIGNAL CONVERTER
 12 Claims, 1 Drawing Fig.

[52] U.S. Cl. ................................................ 323/1,
 330/40, 340/186, 340/210
[51] Int. Cl. ..................................................... G05f,
 G08c, H03f 3/04
[50] Field of Search ........................................ 340/186,
 210; 307/270, 308, 310; 321/8; 330/40; 73/362
 SC; 323/1

[56] References Cited
UNITED STATES PATENTS

| | | | |
|---|---|---|---|
| 3,503,261 | 3/1970 | Ziester et al. | 340/186 X |
| 3,560,948 | 2/1971 | Inose et al. | 340/210 X |
| 3,562,729 | 2/1971 | Hurd | 330/40 X |
| 3,517,556 | 6/1970 | Barker | 340/186 X |
| 3,546,564 | 12/1970 | Denny | 323/1 |

Primary Examiner—William H. Beha, Jr.
Attorneys—Carl A. Hechmer, Jr. and Stanley Bilker ABSTRACT: A circuit system for converting small DC signals into milliampere signals in which the signals from a voltametric sensing device are converted into standard level current signals for transmission over the same two-wire power lines that supply voltage to the circuit. A current sensor imposed across the output load of an operational amplifier provides fractional feedback to the input thereof and produces a voltage swing of approximately 30 volts, over the power lines. The power supply to the amplifier is regulated and temperature compensated and is fully compensated for zero shift.

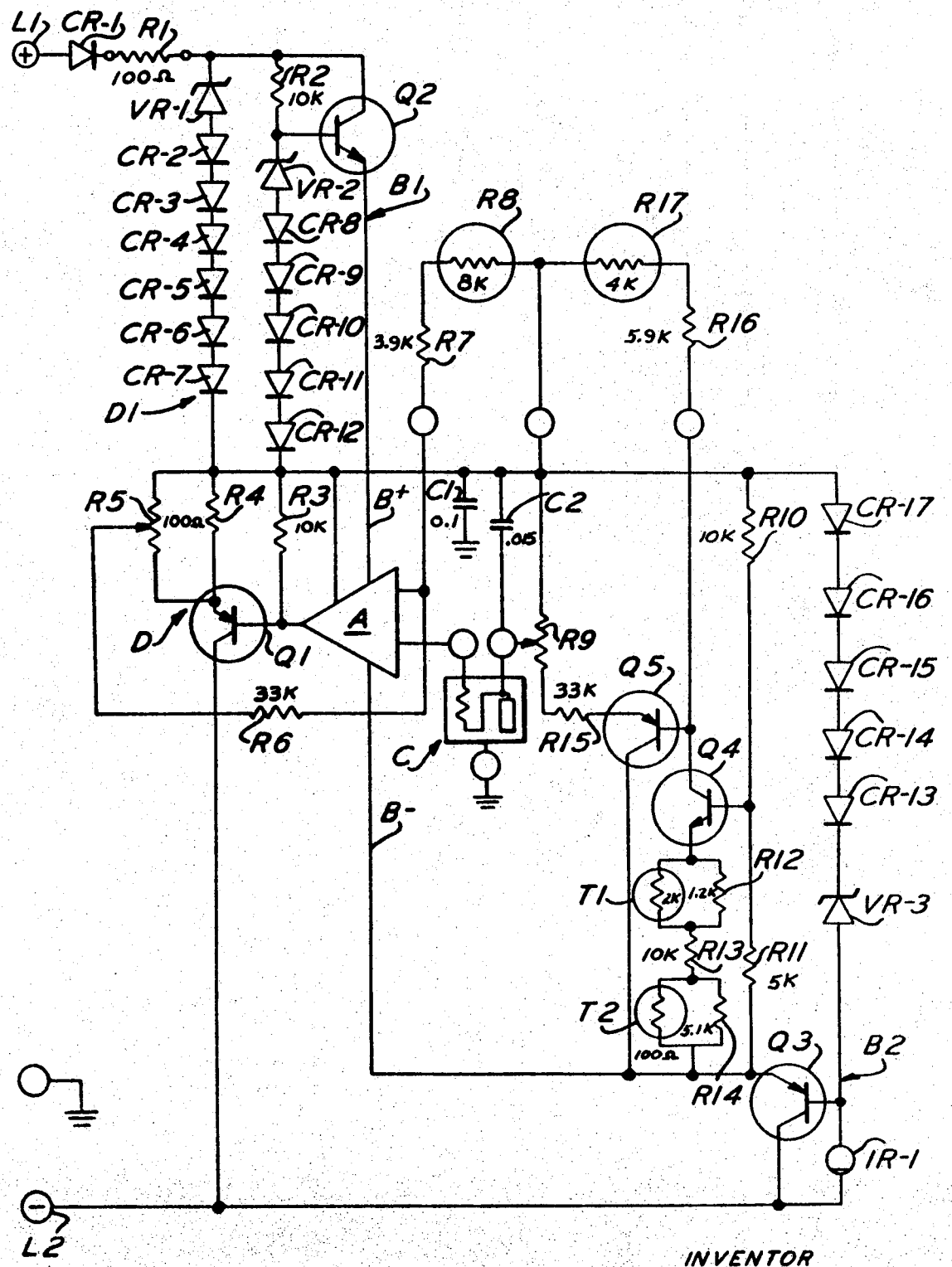

3,626,274

TWO-WIRE MILLIVOLT TO MILLIAMPERE SIGNAL CONVERTER

This invention relates to an electronic or solid state circuit for converting low level DC signals from voltametric sensing devices into standard level current signals. More particularly, this invention relates to a two-wire system for converting millivolt signals from such sensors as cells and probes used in measuring hydrogen ion concentration (pH), dissolved oxygen, ionization, and the like, especially in locations where no AC power is available or where explosive atmospheres present problems.

It is an object of this invention to provide a means for transmitting low level DC signals developed by very high impedance cells, probes and other voltage-creating devices along the very same power line which supplies voltage to the electronic circuit amplifying the signal intelligence.

Another object of this invention is to provide a two-wire millivolt to milliampere signal converter which can operate in remote locations where AC power is not available.

Yet another object of this invention is to provide a two-wire millivolt-to-milliampere signal converter which will function safely in explosive environments.

Still a further object of this invention is to provide a two-wire signal converter having a high impedance input for coupling to small DC voltametric sensing devices, such as pH or hydrogen ion concentration measuring probes or cells, and having a low-impedance output, whereby low level DC signals can be measured and faithfully converted into milliampere signals to remote locations with negligible noise or interference.

Other objects of this invention are to provide an improved device of the character described which is easily and economically produced, sturdy in construction, and highly efficient in operation.

With the above and related objects in view, this invention consists of the details of construction and combination of parts as will be more fully understood from the following detailed description when read in conjunction with the accompanying drawing in which:

The FIGURE is an electrical schematic diagram of a two-wire millivolt-to-milliampere signal converter embodying this invention.

Referring now in greater detail to the drawing in which similar reference characters refer to similar parts, there is shown a two-wire signal converter circuit comprising an operational amplifier, generally designated as A, a network furnishing a regulated and temperature compensated B plus and B minus supply voltage B1 and B2 respectively from the two-wire power lines to the amplifier, voltage sensing means C applying a millivolt signal from a source being measured to the input of the amplifier, and current sensing means D coupled to the voltage output of the amplifier and applying fractional feedback to the amplifier while at the same time delivering a milliampere signal to the power transmission lines.

The amplifier A is designated schematically and can comprise any one of a number of solid state operational amplifiers which are adapted to function in a different or common mode, for example, an ADO-29B high performance operational amplifier made by Fairchild Controls of Mountain View, California. The amplifier circuit internally includes a high-impedance differential input which is obtained by the use of metal oxide semiconductor field effect transistors (Mosfet's) together with a low-impedance output. Provisions are incorporated within the circuit itself whereby external components may be used to compensate the amplifier for stable operation under various feedback or load conditions. Matching of internal components and fabrication techniques produces low drift and offset characteristics.

The power supply for the amplifier A is obtained through a pair of conductive lines L1(+) and L2(−) which are connected to a DC voltage source (not shown) at a remote location, for example. A rectifier CR-1 in the line L1 protects the signal converter circuit components of the instant invention against possible reversed polarity situations. A 300 ohm resistor R1 also in series with the supply line L1 acts to limit power dissipation of a current regulator transistor Q1 contained in the current sensor D. The network B1 furnishes a regulated and temperature compensated positive supply voltage for the differential operational amplifier A. Network D1 is the signal current path and includes a voltage regulator zener diode VR-1, for example a 1N3314A, which not only operates as a high current path but also as a voltage preregulator for the B plus supply voltage B1 to amplifier A. Rectifiers CR-2 to CR-7 compensate for ambient temperature effects on the zener diode VR-1.

The stable voltage supply circuit B1 for furnishing B plus to the amplifier includes a 10K resistor R2 which is coupled to the positive line L1 and is connected across the collector and base of transistor Q2. The resistor R2 functions as a current limiter for the base of Q2 as well as for voltage regulator zener diode VR-2. VR-2 may be a 1N-4742 zener diode which serves to act as a voltage regulator for the B plus side. Rectifier CR-8 to CR-12 provide compensation for ambient temperature effects on VR-2 and Q-2. Transistor Q2 in this case is a 2N-697.

The B minus supply network B2 incorporates a 1N-4742 voltage regulator zener diode VR-3 which in combination with transistor Q-3 (2N-4001) acts to provide voltage regulation and with rectifiers CR-13 to CR-17 providing compensation for ambient temperature effects. A current regulator diode IR-1, for example a 1N-5305, supplies constant current to voltage regulator diode VR-3 without being affected by large voltage swings due to signal current.

The sensing device C comprises any cell or probe system which develops a low level DC signal in response to changes in concentration, stress, conductivity, etc. The sensor C is designated schematically since it may constitute for example a pH measuring device, a polarograph, a biological oxygen-measuring system, a device for electrically determinating fluoride ion concentration in water, or any system having a DC signal output in the order of millivolts.

The DC signal developed by the probe or sensor C is applied to the very high impedance positive input terminal of the differential operational amplifier. The output of the operational amplifier A is imposed across resistor R3, 10K for example, which forms a load for the amplifier and assures turn off of the current regulator transistor Q1. Transistor Q1 is the pass transistor which controls the flow of signal current. Resistor R4 is a 100-ohm, 5-watt resistor which is incorporated in the emitter circuit of transistor Q1. Resistor R4 in combination with potentiometer R5 (0.0 to 20K) forms a voltage sensor, the voltage across which is proportional to the signal current. Since resistor R4 has a low temperature coefficient, temperature effects on potentiometer R5 are minimized. Potentiometer R5 in conjunction with resistors R6 (33K), 3.9K resistor R7 and thermistor R8 define a fractional feedback circuit for the amplifier. The resistor R7 and thermistor R8 double as a temperature sensor for the solution or environment to be measured. Resistor R8, part of the external temperature sensor, changes the gain of the amplifier A continuously to compensate for the varying potential of the measuring probes or cells in the sensor C caused by solution or environment temperature. emitter A zero adjustment potentiometer R9 is coupled to the sensor C. The zero adjustment is retained at a constant level by means of current and voltage regulator transistors Q4 (2N-697) and Q5 (2N-4037). Resistor R10 and R11 form a voltage divider network to provide a fixed potential to the base of transistor Q4. Resistors R12, R13, and R14 in combination with thermistors T1 and T2 and transistor Q4 form a temperature compensated current regulator, the current thereof appearing across R16 and R17 as a voltage to provide in turn correct bias for transistor Q5. Transistor Q5 in conjunction with potentiometer R9 and 33K resistor R15 again define a current regulator. While resistors R9 to R15, thermistors T-1 and T-2, and transistors Q4 and Q5 cooperate to provide essentially constant voltage, resistors R16 and R17, which are part of the external temperature sensor, change the potential bias voltage for transistor Q5 to compensate for zero shift. Capacitors C1 and C2 act as AC filters to assure noise free operation from extraneous pickup or interference.

As is apparent from the foregoing description, the current sensor D controls the signal flow, approximately 10 to 50 milliamperes, and further provides feedback to the input of the operational amplifier for control thereof. The output of the operational amplifier A controls the current sensor D. Accordingly, a current swing of 50 milliamperes across 600 ohms will produce a voltage swing of 30 volts at the junction of the negative line terminal L2 with the collector of the current regulator transistor Q1. Thus, the instant invention acts as an essentially safe millivolt to milliampere signal converter in which the current signals are transmitted over the same two-wire power lines which supply B plus and B minus to the circuitry itself. Since only low currents flow in the power line L1 and L2, the present signal converter can operate in remote locations where no AC power is available or in locations with explosive atmospheres. Because of the high input and low output impedance of this signal converter in addition to the filter network, the millivolt-to-milliampere signal conversion is accomplished with fidelity without noise or interference. As will be recognized by those skilled in the art, the foregoing signal converter can utilize a chopper stabilized operational amplifier with minimal conversional elements as well as operational amplifiers with lower input impedances.

Although this invention has been described in considerable detail, such description is intended as being illustrative rather than limiting, since the invention may be variously embodied, and the scope of the invention is to be determined as claimed.

What is claimed is:

1. A two-wire system for converting small DC signals into milliampere signals comprising:
    means for sensing DC signals from a very high impedance probe source,
    an operational amplifier including means constituting a high input impedance coupled to said means for sensing and means constituting a low impedance output,
    means constituting a current sensor having an input coupled across the output of said operational amplifier,
    a pair of conductive paths for coupling across a power source,
    means constituting a high current path and preregulator coupling one of said conductive paths to the input of said current sensor,
    B plus means for furnishing a regulated and temperature compensated positive supply voltage from the first one of said conductive paths to said operational amplifier,
    B minus means for furnishing a regulated and temperature compensated negative supply voltage from the other of said conductive paths to said operational amplifier,
    said current sensor having an output signal current applied to the other of said conductive paths and including means for applying fractional feedback to the input of said operational amplifier.

2. The circuit system of claim 1 wherein said high current path and preregulator means includes a zener diode and a plurality of diode rectifiers.

3. A two-wire system for converting small DC signals into milliampere signals comprising means for sensing DC signals from a very high impedance probe source, an operational amplifier having a high input impedance coupled to said means for sensing and a low-impedance output, means constituting a current sensor having an input coupled across the output of said operational amplifier, a pair of conductive paths for coupling across a power source, means constituting a high current path and preregulator coupling one of said conductive paths to the input of said current sensor, B plus means for furnishing a regulated and temperature-compensated positive supply voltage from the first one of said conductive paths to said operational amplifier, B minus means for furnishing a regulated and temperature-compensated negative supply voltage from the other of said conductive paths to said operational amplifier, said current sensor having an output signal current applied to the other of said conductive paths and in addition applying fractional feedback to the input of said operational amplifier, said B plus means comprising a transistor including an emitter connected to said operational amplifier, a collector connected to the first one of said conductive paths, and a base, a resistor connected across said first one of said conductive paths and said base defining a current limiter for said transistor, and a zener diode and a plurality of diode rectifiers coupled to the load of said operational amplifier and respectively defining voltage regulation and ambient temperature compensation.

4. The circuit system of claim 3 wherein said B minus means comprises a current regulator diode having one end connected to the other of said conductive paths and passing a fixed amount of current therefrom, a voltage regulator zener diode connected to the other end of said current regulator diode, a second plurality of diode rectifiers connecting the other end of said zener diode with said load, and a second transistor including a base and collector coupled across said current regulator diode, and an emitter connecting the negative supply voltage to said operational amplifier.

5. The circuit system of claim 4 including means constituting a potentiometer across said negative voltage supply for adjustment of zero balancing.

6. The circuit system of claim 5 wherein said means for adjustment of zero balancing comprises a voltage-divider resistance network having one end connected to the load and the other end to the emitter of said second transistor, and a third transistor including a base connected to an intermediate portion of said resistor network, a thermistor network coupling the emitter of said third transistor to the emitter of said second transistor, a fourth transistor including a base coupled to the collector of said third transistor, a collector coupled to the emitter of said second transistor, and an emitter connected to the fixed portion of said potentiometer, the movable portion of said potentiometer being connected to one end of said sensing means.

7. The circuit system of claim 5 including means to compensate for variations in temperature of samples being measured.

8. The circuit system of claim 7 wherein said means to compensate comprises a thermistor having one end connected to the feedback input to said operational amplifier and the other end to the load.

9. The circuit system of claim 8 including means to compensate for zero shift of said voltage supply.

10. The circuit system of claim 9 wherein said means to compensate for zero shift comprises a thermistor connected at one end to the load and the other end being coupled to the collector of said third transistor and the base of a fifth transistor whose collector is connected to the emitter of said second transistor and whose emitter is connected to the load through a resistance.

11. The circuit system of claim 3 including a rectifier in one of said conductive paths to protect the circuit against reversals in polarity.

12. The circuit system of claim 11 including a resistor in series with the conductive path containing said rectifier in order to limit power dissipation of said current limiting transistor if low resistance loads are used.

* * * * *